United States Patent [19]
Flipot et al.

[11] 3,949,027
[45] Apr. 6, 1976

[54] MANUFACTURING PROCESS FOR IMPROVED NUCLEAR FUEL TABLETS

[75] Inventors: Alfred-Jean Flipot, Geel; Armand Smolders, Olmen, both of Belgium

[73] Assignees: Belgonucleaire, Brussels, Belgium; Centre d'Etude de l'Energie Nucleaire, both of Brussels, Belgium

[22] Filed: Mar. 7, 1973

[21] Appl. No.: 338,850

[30] Foreign Application Priority Data
Mar. 24, 1972  Belgium ............................. 115513

[52] U.S. Cl. ...................... 264/.5; 176/73; 176/90
[51] Int. Cl.² ........................................ G21C 21/00
[58] Field of Search ............... 264/.5, 3; 176/90, 89, 176/66, 67, 73; 75/214; 425/78; 100/240, 245, 251

[56] References Cited
UNITED STATES PATENTS

| | | | |
|---|---|---|---|
| 2,907,705 | 10/1959 | Blainey | 264/.5 |
| 2,975,113 | 3/1961 | Gordon | 264/.5 UX |
| 3,075,244 | 1/1963 | Glenn | 75/214 X |
| 3,284,372 | 11/1966 | Bailey | 264/.5 |
| 3,358,058 | 12/1967 | Losty | 264/.5 UX |
| 3,428,717 | 2/1969 | Accary et al. | 264/.5 |
| 3,676,079 | 7/1972 | Morgan | 264/.5 X |
| 3,736,084 | 5/1973 | Mitchell | 425/78 |
| 3,823,067 | 7/1974 | Stern et al. | 264/.5 |

Primary Examiner—Verlin R. Pendegrass
Assistant Examiner—Harold Tudor
Attorney, Agent, or Firm—Ostrolenk, Faber, Gerb & Soffen

[57] ABSTRACT

Process for manufacturing improved nuclear fuel pellets, including compacting ceramic powder in the Compaction chamber of a pelletizing machine with only the lower punch moving on compaction, wherein the walls of the compaction chamber are widened on at least part of their height in the direction of a diameter increase towards the die-bearing table.

3 Claims, 6 Drawing Figures

MANUFACTURING PROCESS FOR IMPROVED NUCLEAR FUEL TABLETS

This invention relates to nuclear fuel and more particularly to ceramic fuel tablets or pellets used in nuclear reactors. These ceramic pellets generally consist of uranium, plutonium, thorium, etc.. in oxide, nitride, carbide or other form. The manufacturing process for these pellets comprises the compression of appropriate powder in a cylindrical mould, followed by sintering to confer to the pellets the necessary characteristics, such as mechanical resistance and density.

The sintering cycle however gives rise to shrinkage of the raw material, which may attain about 50 % of the green volume. Thus the sintering of the pellet influences its final form; more particularly, the pellet will not shrink uniformly on sintering and will shrink more in the less dense areas if the density of the raw pellet is not homogeneous after compression.

The peculiar friction conditions on compression do not allow a homogeneously dense pellet to be obtained. Therefore the pellets are at present rectified after sintering, in order to correct their form, so that the final product obtained is properly cylindrical. The diametrical tolerances set by the users of nuclear fuel pellets are generally very strict, so that rectification, mostly effected by grinding, can hardly be avoided.

It has been noted that density differences in the raw pellets on compression are a function of the relative movement of the punches in the compaction chamber. Indeed, when using a double-acting press, i.e. compressing by simultaneous shifting of the upper and lower punches, the lateral surface of the obtained cylindrical pellet presents, after sintering, an inwardly incurved configuration or "diabolo" configuration. If, on the other hand, one uses a single-acting pelletizing machine, i.e. with only one punch moving on compression, the obtained pellet will, after sintering, present a configuration resembling a cone trunk, the broad base of which corresponds to the part of the pellet in contact with the mobile punch. In order to make these pellets comply with the specifications, their "diabolo" or conical form must be rectified by grinding their lateral side so as to obtain a cylindrical surface.

The invention proposes an improved compression phase, allowing avoidance of rectification of the pellets after sintering. According to the invention, the pellet is compressed solely by shifting the lower punch of a pelletizing machine in a compaction chamber of which at least the upper part of the walls is inclined in the direction of a diameter increase towards the die-bearing table, on a height corresponding at least to the height of the compressed pellet. The inclination angle, i.e. the angle formed by the vertical axis of the die and the intersection line between an axial plan and the inclined wall, will generally lie between 1°30' and 0°6' as a function of the compaction conditions, the diameter of the pellets and the nature of the powder. The walls are preferably inclined on their whole height, but it is evident that, if the pellet to be compressed is rather high and the compression ratio rather elevated, the walls may have a lower cylindrical part and an upper inclined part. Generally it is enough to have walls inclined on a height corresponding to the tablet to be compressed to obtain the advantages according to the invention. The inclined part should then be situated on the upper part of the wall.

A pellet, compressed according to the invention, will thus have the configuration of a cone trunk, the large base of which will be the less dense part. After sintering, this pellet will generally have a substantially cylindrical form and rectification will be superfluous.

The invention will now be described by way of example, with reference to the accompanying drawings, of which:

Figure 1:
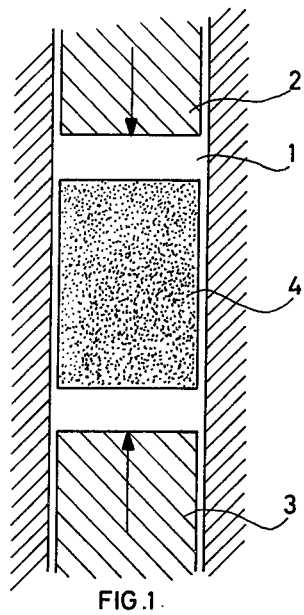
FIGS. 1 and 3 represent the compression of a fuel pellet according to the art.

FIG. 1 shows the compaction chamber 1 of an hydraulic press; the punches 2 and 3, which move in the direction shown by the arrows; and the $UO_2$ pellet 4.

Figure 2:
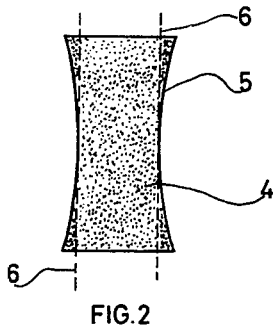
FIGS. 2 and 4 represent the pellets obtained according to the compression of FIGS. 1 and 3 after sintering.

FIG. 2 shows the pellet 4 after sintering, and the deformation of its lateral wall 5, which is incurved inwards. This pellet must be brought down to the prescribed dimensions by grinding it along the dotted lines 6 before it can be used.

Figure 3:
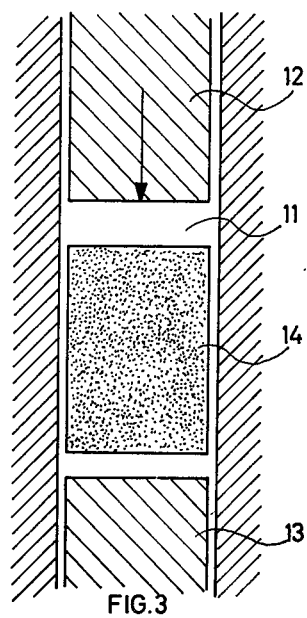
Figure 4:
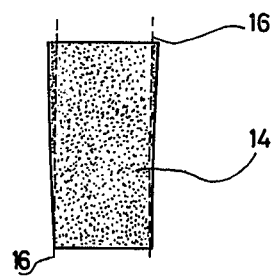
Figure 6:
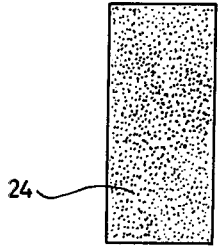

FIG. 3 represents the compaction chamber 11 of a mechanical press; the upper punch 12, mobile during the compression phase, shifts in the direction shown by the arrow; the lower punch 13, fixed during the compression; as well as the $UO_2$ pellet 14. FIG. 4 shows the pellet 14 after sintering and its cone trunk form. Before using this pellet it will equally be necessary to bring it down to the prescribed dimensions by grinding it along the dotted lines 16.

Figure 5:
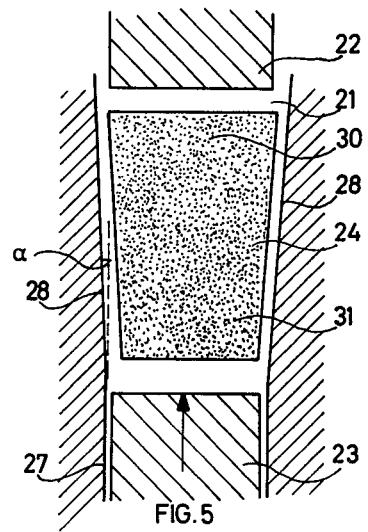
FIG. 5 shows the compression of a fuel pellet according to the invention and FIG. 6 this same pellet after sintering.

FIG. 5 represents the compression of a $UO_2$ pellet according to the invention. It shows the compaction chamber 21, the upper punch 22, fixed during the compaction cycle, and the lower mobile punch 23 shifting in the direction of the arrow during the compaction phase.

The compressed pellet is represented by reference number 24. As shown on FIG. 5, the upper part 28 of the walls of the compaction chamber 21 is slightly widened, so that the section near the upper punch 22 has a slightly larger surface than the section near the lower punch 23; the lower part 27 of the walls is cylindrical. The angle $\alpha$, as defined above, is equally shown on the figure.

After compaction, the tablet 24 thus has slightly flared lateral walls. Since, owing to the particular friction conditions on compression, the green density of the part 30 of the pellet 24, situated near the upper punch 22 on compression, is smaller than the green density of the part 31 of the pellet, situated near the punch 23 on compression, the part 30 will shrink more than the part 31 of the pellet when sintered. Thus, after sintering, the pellet will have a substantially cylindrical form and does not need rectification.

The angle $\alpha$, formed by the vertical axis of the mould and the intersection line between an axial plan and the inclined wall, will be determined for each fabrication batch separately, as a function of the interfering parameters, i.e. the nature of the powder, the diameter of the pellet, the compression density, the friction between the powder and the die wall, the internal friction between the grains, the state of the equipment surfaces, the kind of apparatus, the lubrification means etc.

The invention will be hereinafter more fully described with the help of two different examples of pelletizing.

EXAMPLE 1

Ceramic sinterable uranium oxide powder is compressed in an hydraulic press comprising a tungsten carbide-tipped die. The characteristics of the powder are the following:

oxygen content : O/U = 2.08
apparent density : 2.1
average diameter of the grains : 1.6 $\mu$m
specific surface : 4 m$^2$/g.

Before the compression cycle, the equipment will be lubrified by means of a preliminary compression cycle with polystyrene balls containing 3 % zinc stearate. The diameter of the die is 12 mm and the conicity of the walls is defined by an angle $\alpha = 26'10''$, corresponding to a radius increase of 75 microns per cm height.

After 10 seconds compression, the compressed UO$_2$ pellet has a green density of 5.63 and a height of 11.9 mm. The pellet is then sintered for an hour, at 1650°C in an argon atmosphere containing 5 % hydrogen. The density then reaches 10.47 or 95.5 % of the theoretical density. The height of the sintered pellet is 9.62 mm, and its diameter 9.83 mm. The shape of the pellet is then inspected with an apparatus having an accuracy of 2 microns.

The difference in diameter found on the pellet is 12 microns.

EXAMPLE 2

Uranium oxide powder is compressed in a rotative press with steel equipment, lubrified by means of a preliminary lubrification cycle with polystyrene balls containing 2 % zinc behenate. The characteristics of the powder are the following:

oxygen content : 2.07
apparent density : 2.1
average diameter of the grains : 0.6 $\mu$m
specific surface : 3 m$^2$/g The diameter of the mould is 15 mm and the conicity of the walls is defined by an angle $\alpha = 20'43''$, corresponding to a radius increase of 60 microns per cm height.

The pellet, compressed to a density of 5.4, is sintered for 4 hours at 1650°C in an argon atmosphere containing 5 % hydrogen. The obtained pellet then has a density of 10.36 or 94.5 % of the theoretical density. The diameter divergences of this pellet lie below 15 microns.

After the same manufacturing cycle with classical double compression (as shown in FIG. 1) the obtained pellets have a "diabolo" form with diameter divergences of 70 microns.

These examples clearly show the efficiency of the method according to the invention.

The method according to the invention allows manufacture of pellets with diameter divergences lying within the prescribed diametrical tolerances.

Thus, rectification of the pellets may be avoided and the fabrication cycle notably shortened.

Avoiding rectification is particularly advantageous because no rectification scraps are formed and the recovery of said scraps is thus superfluous.

Of course, this absence of rectification wastes is still more advantageous when the fuel pellets contain fissile material which should be very carefully handled.

It is evident that the examples described above are not at all limitative and that the man skilled in the art will find numerous modifications or improvements without leaving the field of the invention.

Compaction chambers with slightly inclined walls have already been proposed for facilitating the ejection of tablets. The very slight inclination proposed to this end could be defined by an angle of hardly 0°3' and does not allow the advantages of the compression according to the invention to be obtained. This conicity, moreover, reduced the regularity form of the tablets, since the presses used had either two mobile punches or an upper mobile punch; the use of a lower mobile punch was as yet exceptional.

What we claim is:

1. A process for the compaction of a ceramic nuclear fuel pellet in a compaction chamber comprising an upper fixed punch and a lower movable punch surrounded by a stationary vertically extending lateral wall by compressing the pellet therein, wherein compression is effected by shifting the movable punch towards the fixed punch, and wherein the lateral wall is inclined outwardly toward the direction of the fixed punch for at least a part of the distance between the fixed and movable punches wherein the angle between the inclined wall and an imaginary line where a noninclined wall would have been is between 1°30' and 0°6'.

2. The process of claim 1 wherein the lateral wall is inclined over the entire distance between the fixed punch and the movable punch.

3. The process of claim 1 wherein the lateral wall is inclined only over that portion of the distance between the fixed and movable punches from the fixed punch to a point distant therefrom corresponding to the height of the pellet after compression.

* * * * *